United States Patent
Kim et al.

(10) Patent No.: US 8,942,257 B2
(45) Date of Patent: Jan. 27, 2015

(54) WIRELESS NETWORK USING FEEDBACK OF SIDE INFORMATION AND COMMUNICATION METHOD USING NETWORK CODING

(75) Inventors: Kwang Taik Kim, Yongin Si (KR); Chan Soo Hwang, Yongin Si (KR); Vahid Tarokh, Cambridge, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 603 days.

(21) Appl. No.: 12/970,443

(22) Filed: Dec. 16, 2010

(65) Prior Publication Data

US 2011/0206065 A1   Aug. 25, 2011

(30) Foreign Application Priority Data

Feb. 23, 2010   (KR) .......................... 10-2010-0016054

(51) Int. Cl.
*H04J 3/24* (2006.01)
*H04L 1/16* (2006.01)
*H04L 1/18* (2006.01)
*H04L 1/20* (2006.01)
*H04L 1/00* (2006.01)

(52) U.S. Cl.
CPC ............ *H04L 1/1607* (2013.01); *H04L 1/1893* (2013.01); *H04L 1/203* (2013.01); *H04L 1/0016* (2013.01); *H04L 1/1819* (2013.01)
USPC ....................................................... 370/474

(58) Field of Classification Search
None
See application file for complete search history.

(56) References Cited

U.S. PATENT DOCUMENTS

| | | | |
|---|---|---|---|
| 5,657,325 A | 8/1997 | Lou et al. | |
| 7,516,388 B2 * | 4/2009 | Matsumoto | 714/752 |
| 2002/0075867 A1 * | 6/2002 | Herrmann | 370/389 |
| 2006/0002484 A1 * | 1/2006 | Miyazaki et al. | 375/259 |
| 2007/0079223 A1 * | 4/2007 | Mondin et al. | 714/780 |
| 2010/0074319 A1 * | 3/2010 | Tseng et al. | 375/232 |
| 2010/0157901 A1 * | 6/2010 | Sanderovitz et al. | 370/328 |
| 2010/0251069 A1 * | 9/2010 | Sun et al. | 714/758 |
| 2010/0278036 A1 * | 11/2010 | Dai et al. | 370/216 |

FOREIGN PATENT DOCUMENTS

| | | |
|---|---|---|
| EP | 0 999 658 | 5/2000 |
| KR | 10-2002-0095125 | 12/2002 |
| KR | 10-2006-0115175 | 11/2006 |
| WO | WO 99/44341 | 9/1999 |

OTHER PUBLICATIONS

Katti et al., "XORs in the Air: Practical Wireless Network Coding," *In the Proceedings of ACM SIGCOMM*, 2006, pp. 497-510.
Fragouli et al., "Network Coding Applications," *Foundations and Trends in Networking*, vol. 2, No. 2, 2007, pp. 135-269.

* cited by examiner

*Primary Examiner* — Minh-Trang Nguyen
(74) *Attorney, Agent, or Firm* — NSIP Law

(57) ABSTRACT

A receiver that generates side information associated with information that is transmitted with packet data and that is included in received packet data, and that feeds back the side information to the transmitter, is provided. The transmitter may generate and transmit additional redundant bits based on the side information.

27 Claims, 8 Drawing Sheets

US 8,942,257 B2

WIRELESS NETWORK USING FEEDBACK OF SIDE INFORMATION AND COMMUNICATION METHOD USING NETWORK CODING

CROSS-REFERENCE TO RELATED APPLICATION(S)

This application claims the benefit under 35 U.S.C. §119(a) of Korean Patent Application No. 10-2010-0016054, filed on Feb. 23, 2010, in the Korean Intellectual Property Office, the entire disclosure of which is incorporated herein by reference for all purposes.

BACKGROUND

1. Field

The following description relates to apparatuses that communicate in a wireless network, and more particularly, to a receiver may that feeds back side information associated with transmitted packet data to a transmitter.

2. Description of Related Art

In a network wherein a single transmitter and a single receiver exist, the receiver may transmit an acknowledgment (ACK) to the transmitter when the receiver successively decodes packet data received from a transmitter. The receiver may transmit a negative-acknowledgment (NACK) to the transmitter when the receiver does not successively decode the received packet data. In this example, the receiver may discard all received packet data, which can be a waste of radio resources. Although the receiver does not successively decode the received packet data, the received packet data may include partial information associated with the transmitted packet data. This partial information may be useful, but by discarding all of the received packet data, the partial information is also discarded.

A chase combining scheme and an incremental redundancy scheme may be used to reduce the waste of radio resources caused by the discarding of the entire received packet data. According to the chase combining scheme, the receiver may combine previously received packet data that has been successfully decoded and previously unsuccessfully decoded packet data that is transmitted again. Accordingly, the previously received packet data that has been successfully decoded may be utilized. In the incremental redundancy scheme, the transmitter may gradually increase redundant bits in response to a NACK.

SUMMARY

Other features and aspects may be apparent from the following description, the drawings, and the claims.

In one general aspect, there is provided a communication method of a receiver, the method including receiving packet data transmitted from a transmitter, generating side information indicating an amount of information that is associated with the transmitted packet data and that is included in the received packet data, feeding back the side information.

The generating of the side information may include generating the side information based on a Log Likelihood Ratio (LLR) with respect to each bit of the received packet data.

The generating of the side information may include calculating at least one of mutual information between the transmitted packet data and the received packet data, bit error probability corresponding to the received packet data, and an index of a refinement code recommended by the receiver.

The generating of the side information may further include averaging the mutual information or the bit error probability.

The calculating may include calculating the bit error probability based on the mutual information.

The side information may be the information that is associated with the transmitted packet data and that is included in the received packet data, or information associated with a request of the receiver to successively decode the received packet data.

At least one of a code rate of the transmitted packet data and a refinement code of the transmitted packet data may be determined based on the side information.

The feeding back may include feeding back the side information based on whether the received packet data is successively decoded or based on whether a value corresponding to the side information is greater than a predetermined value.

In another aspect, there is provided a communication method of a transmitter, the method comprising receiving side information fed back from a receiver, the side information indicating an amount of information that is included in transmitted packet data transmitted from a transmitter and that is included in packet data that is received by the receiver, generating additional redundant bits based on the side information, and transmitting the additional redundant bits to the receiver.

The generating of the additional redundant bits may include selecting at least one code corresponding to the side information based on a refinement code including systematic codes, and utilizing the at least one code to generate the additional redundant bits.

The utilizing may include generating coded packet data by utilizing the at least one code, and extracting the additional redundant bits from the coded packet data.

The generating of the additional redundant bits may include selecting a Modulation and Coding scheme (MCS) corresponding to the side information based on a table with respect to a plurality of MCSs, and utilizing the selected MSC to generate the additional redundant bits.

The side information may include at least one of mutual information between the transmitted packet data and the received packet data, bit error probability corresponding to the received packet data, and an index of a refinement code recommended by the receiver.

The transmitting may include transmitting the additional redundant bits without transmitting packet data.

In another aspect, there is provided a communication method of a relay station in a network including a pair of a first transmitter and a first receiver, a pair of a second transmitter and a second receiver, and the relay station performs network coding, the method including receiving first packet data broadcasted from the first transmitter and second packet data broadcasted from the second transmitter, receiving first side information fed back from the first receiver and second side information fed back from the second receiver, generating additional redundant bits for the first receiver and additional redundant bits for the second receiver based on the first side information and the second side information, and broadcasting the additional redundant bits for the first receiver and the additional redundant bits for the second receiver, and the first side information indicates an amount of information that is associated with the first packet data transmitted from the first transmitter and that is included in first packet data received by the first receiver, or indicates an amount of information that is associated with the second packet data transmitted from the second transmitter and that is included in second packet data received by the first receiver, and the second side information indicates an amount of information that is associated with the first packet data transmitted from the first transmitter and that is included in first packet data received by the second receiver, or indicates an amount of information that is associated with the second packet data transmitted from the second transmitter and that is included in second packet data received by the second receiver.

The method may further include performing network coding of at least one portion of additional redundant bits for the first receiver and performing network coding of at least one portion of additional redundant bits for the second receiver, and the broadcasting may include broadcasting the network coded additional redundant bits.

The generating may include determining additional redundant bits that the first receiver uses for decoding the first packet data and the second packet data and determining additional redundant bits that the second receiver uses for decoding the first packet data and the second packet data, based on the first side information and the second side information, to generate the additional redundant bits for the first receiver and the additional redundant bits for the second receiver.

The generating may include selecting at least one code corresponding to the first side information and the second side information based on a refinement codebook including systematic codes, and utilizing the at least one code to generate the redundant bits for the first receiver and the redundant bits for the second receiver. In another aspect, there is provided a computer-readable storage medium having stored therein program instructions to cause a processor to execute a method of a receiver, the method comprising receiving packet data transmitted from a transmitter, generating side information indicating an amount of information that is associated with the transmitted packet data and that is included in the received packet data, and feeding back the side information In another general aspect, there is provided a communication apparatus for a receiver, the apparatus including a receiving unit to receive packet data transmitted from a transmitter, a generating unit to generate side information indicating an amount of information that is associated with the transmitted packet data and that is included in the received packet data, and a feedback unit to feed back the side information to the transmitter.

In another general aspect, there is provided a communication apparatus for a transmitter, the apparatus including a receiver to receive side information fed back from a receiver, the side information indicating an amount of information that is associated with the transmitted packet data transmitted from the transmitter and that is included in the received packet data received by the receiver, a generating unit to generate additional redundant bits based on the side information, and a transmitting unit to transmit the additional redundant bits to the receiver.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
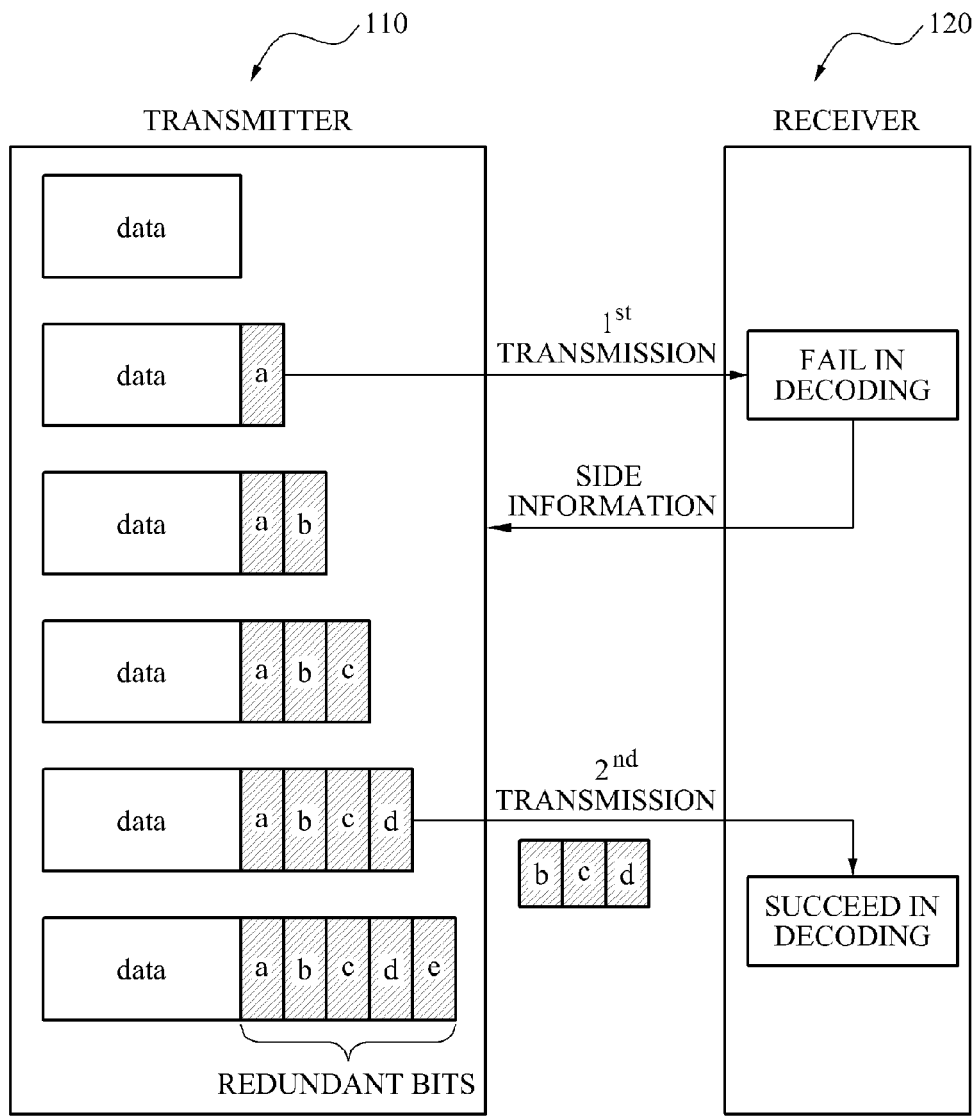
FIG. 1 is a diagram illustrating an example of transmissions between a transmitter and a receiver.

FIG. 1 illustrates an example of transmissions between a transmitter and a receiver.

Referring to FIG. 1, when a transmitter 110 desires to transmit packet data to a receiver 120, the transmitter 110 may transmit, to the receiver 120, the packet data and a minimum redundant bit 'a' in a first phase.

When the receiver 120 successively decodes the received packet data, the receiver 120 may transmit an acknowledgment (ACK) to the transmitter 110 acknowledging successful receipt of the packet data. The receiver 120 may fail to decode the received packet data received the first time due to various causes, for example, an attenuation, a distortion, and the like, of a radio channel between the transmitter 110 and the receiver 120. In this example, although the receiver 120 fails to decode the received packet data, the received packet data may include partial information associated with transmitted packet data that is transmitted from the transmitter 110.

When the receiver 120 fails to decode the received packet data received the first time, the receiver 120 may generate side information and may feed back the side information to the transmitter 110. The side information may include information associated with the transmitted packet data and included in the received packet data, or may be associated with a request of the receiver 120 to successively decode the received packet data. The side information may be calculated based on, for example, a Log Likelihood Ratio (LLR) with respect to each of bits of the received packet data The side information may include, for example, mutual information between the transmitted packet data and the received packet data, bit error probability corresponding to the received packet data, and an index of a refinement code recommended by the receiver.

When the side information is fed back to the transmitter 110, the transmitter 110 may recognize information associated with the transmitted packet data and included in the received packet data received by the receiver 120, based on the side information. The transmitter 110 may determine additional redundant bits based on the side information.

Referring to FIG. 1, the transmitter 110 may determine the additional redundant bits as 'b,' 'c,' and 'd,' based on the side information. In this example, the transmitter 110 does not transmit the data and the redundant bit 'a' again, and instead transmits only the additional redundant bits 'b,' 'c,' and 'd' in a second phase. The receiver 120 may successively decode the received packet data based on the additional redundant bits 'b,' 'c,' and 'd.' Conversely, when the receiver 120 does not successively decode the transmitted packet data, the receiver 120 may feed back the side information again.

1. Feedback of ACK and Side Information in Pair of Single Transmitter and Single Receiver (1) Side Information 1) Side Information in a Gaussian Channel An Additive White Gaussian Channel (AWGN) is used to describe a process of generating the side information. In this example, 'c' is a discrete binary phase shift keying (BPSK) signal from among redundant bits and transmitted data packets transmitted from a transmitter, and a receiver receives the 'c' as 'y.' In this example, y=c+n, where 'n' is noise and 'c' is either −1 or 1. When the posteriori probability p(c=1|y) is greater than p(c=−1|y), the receiver determines that 'c' transmitted from the transmitter is 1, and when the posteriori probability p(c=1|y) is less than or equal to p(c=−1|y), the receiver determines that the transmitted 'c' transmitted from the transmitter is −1.

The receiver may use an LLR to determine whether the posteriori probability p(c=1|y) is greater than, equal to, or less than p(c=−1|y). For ease of description, it is assumed that a probability of 'c' being 1 and a probability of 'c' being −1 are the same. In this example, p(c=1)=p(c=−1)=0.5. However, it should be appreciated that the probability of 'c' being 1 and the probability of 'c' being −1 may be different, and the examples described below may be applied in the same manner. When the probability of 'c' being 1 and the probability of 'c' being −1 are the same, the LLR may be expressed by Equation 1.

$$LLR(c|y)=\log \{p(c=1|y)/p(c=-1|y)\} \quad [\text{Equation 1}]$$

When the LLR is calculated as expressed by Equation 1, p(c=1|y) and p(c=−1|y) may be expressed by Equation 2.

$$p(c=1|y) = \frac{\exp(LLR(c|y))}{1+\exp(LLR(c|y))} \quad [\text{Equation 2}]$$

$$p(c=-1|y) = \frac{1}{1+\exp(LLR(c|y))}$$

The posteriori probabilities may be calculated based on the LLR as given in Equation 2. In this example, the posteriori probabilities may be used to calculate an amount of information included in 'y' and the information associated with 'c'. When mutual information between 'y' and 'c' is I(c;y), the mutual information I(c;y) may indicate the amount of information that is included in 'y' and that is associated with 'c'.

The side information may indicate the similarity between the received bit 'y' and the transmitted bit 'c.' For example, the side information may include the mutual information I(c;y) between the received bit 'y' and the transmitted bit 'c.' If 'y' is similar to 'c,' the mutual information I(c;y) may increase. Meanwhile, if 'y' is not similar to 'c,' the mutual information I(c;y) may decrease.

Accordingly, the side information may indicate the amount of information associated with the transmitted bits and this is included in the received bits. For example, when the transmitter transmits bit 'a(1=100%)', and the received bit is 'a(0.8=80%)', the side information may indicate the amount of information associated with the transmitted bit 'a(1=100%)' and that is included in the received bit 'a(0.8=80%)', in the form of the mutual information I(c;y).

The mutual information I(c;y) may be calculated through a process as below. With respect to a given 'y,' 'c' corresponding to a channel input may be a random variable which is not deterministic. For example, when p(c=1|y)=1 or p(c=1|y)=0, the receiver may determine what is transmitted without ambiguity. When p(c=1|y)=p(c=−1|y)=0.5, the receiver may determine a transmitted symbol without additional information with respect to the given y. According to a Shannon Information Theory, ambiguity that exists when a transmitted bit is detected may be determined as entropy [bits] as expressed in Equation 3.

$$H(c|y)=-p(c=1|y)\log p(c=1|y)-p(c=-1|y)\log p(c=-1|y) \quad [\text{Equation 3}]$$

The mutual information I(c;y) [bits] between 'y' and 'c' may be expressed by Equation 4.

$$I(c;y)=H(c)-H(c|y)=H(c)+p(c=1|y)\log p(c=1|y)+p(c=-1|y)\log p(c=-1|y) \quad [\text{Equation 4}]$$

When p(c=1)=p(c=−1)=0.5, Equation 4 may be expressed by Equation 5.

$$I(c;y)=1+p(c=1|y)\log p(c=1|y)+p(c=-1|y)\log p(c=-1|y) \quad [\text{Equation 5}]$$

Accordingly, the mutual information I(c;y) may be calculated based on the LLR.

Also, a bit error probability, for example, $p(E_i|y)$, may be calculated based on the LLR. A detection of 'c' by the receiver may be modeled according to a binary symmetric channel (BCS) that has a cross-over probability of $p(E_i|y)$. In this example, it is assumed that $p(E_i|y) \leq 0.5$. With respect to the given 'y,' the amount of information that is associated with 'c' and that is included in y may be I(c;y) and a capacity of the BCS may be given as $1-H(p(E_i|y))$. Values of I(c;y) and $1-H(p(E_i|y))$ may be approximately the same. Accordingly, the bit error probability $p(E_i|y)$ may be calculated based on the LLR, as expressed in Equation 6.

$$p(E_i|y) = H^{-1}(1-I(c;y)) = \frac{1}{1+\exp(|LLR(c|y)|)}, \quad [\text{Equation 6}]$$

In Equation 6, for example, a domain H(x)=−x log x−(1−x)log(1−x) may be 0 to 0.5, and H(x)=−x log x−(1−x)log(1−x) may be a binary entropy function. Also, $H^{-1}(\bullet)$ may be an inverse of H(•).

The above description may be generalized with respect to a vector Gaussian. In this example, k input bits $b_1 b_2 \ldots b_k$ may be encoded as a codeword $c=c_1 c_2 \ldots c_n$ having a length of n. It is assumed that a received codeword received via a channel that has noise is $y=y_1 y_2 \ldots y_n$. The vector Gaussian may also have the same optimal detecting rule as a scalar Gaussian. The receiver may calculate posteriori probabilities, for example, $p(b_i=1|y)$ and $p(b_i=0|y)$. When $p(b_i=1|y) > p(b_i=0|y)$, the receiver may determine that $b_i=1$, and otherwise, the receiver may determine that $b_i=0$.

$$LLR(b_i|y) = \log \frac{p(b_i=1|y)}{p(b_i=0|y)} \quad [\text{Equation 7}]$$

When the LLR is given, the posteriori probabilities may be calculated as expressed in Equation 8.

$$p(b_i=1|y) = \frac{\exp(LLR(b_i|y))}{1+\exp(LLR(b_i|y))} \quad [\text{Equation 8}]$$

-continued $$p(b_i = 0 \mid y) = \frac{1}{1 + \exp(LLR(b_i \mid y))}$$

As described in the description associated with the scalar Gaussian, mutual information indicating an amount of information may be calculated based on the LLR as expressed by Equation 9, and the information is associated with $b_i$ and is included in the receiver codeword, $y=y_1 y_2 \ldots y_n$, received by the receiver in the vector Gaussian.

$$I(b_i; y) = 1 + p(b_i = 1 \mid y) \log p(b_i = 1 \mid y) + p(b_i = 0 \mid y) \log p(b_i = 0 \mid y) \quad \text{[Equation 9]}$$

A detection of 'c' by the receiver may be modeled according to a BCS that has a cross-over probability of $p(E_i \mid y)$.

The vector Gaussian may also calculate a bit error probability based on the LLR in the same manner as the scalar Gaussian. A detection of $b_i$ by the receiver may be modeled according to the BCS that has the cross-over probability of $p(E_i \mid y)$. Information that is associated with $b_i$ and that is included in an output of the BSC may be $I(b_i; y)$. A capacity of the BSC may be $1 - H(p(E_i \mid y))$, and thus approximation may be possible as expressed in Equation 10.

$$I(b_i; y) \simeq 1 - H(p(E_i \mid y)) \quad \text{[Equation 10]}$$

Therefore, the bit error probability may be calculated as expressed in Equation 11.

$$p(E_i \mid y) \simeq H^{-1}(1 - I(b_i; y)) = \frac{1}{1 + \exp(|LLR(b_i \mid y)|)},$$

In Equation 11, a domain of $H(x) = -x \log x - (1-x) \log(1-x)$ may be 0 to 0.5, and $H(x) = -x \log x - (1-x) \log(1-x)$ may be a binary entropy function. Also, $H^{-1}(\bullet)$ may be an inverse of $H(\bullet)$.

2) Side Information in a Fading Channel

A quasi-static flat fading model may be used. In this example, k input bits $b_1 b_2 \ldots b_k$ are encoded as a codeword $c = c_1 c_2 \ldots c_n$ having a length of 'n.' The received codeword received via a channel may have an additive Gaussian noise that is $y = y_1 y_2 \ldots y_n$. In this example, the received codeword may be expressed by Equation 12.

$$y = hc + n, \quad \text{[Equation 12]}$$

In Equation 12, 'h' is a channel gain indicating a path-loss, a fading, and a shadowing. When the receiver performs a channel gain 'h,' an optimal detection rule may be a MAP rule. The receiver may calculate $p(b_i = 1 \mid y, h)$ and $p(b_i = 0 \mid y, h)$. When $p(b_i = 1 \mid y, h) > p(b_i = 0 \mid y, h)$, the receiver may determine that $b_i = 1$, and otherwise, the receiver may determine that $b_i = 0$. As described above, the LLR determined based on the MAP rule may be used for the optimal detection rule, and the LLR may be calculated based on Equation 13 as expressed below.

$$LLR(b_i \mid y, h) = \log \frac{p(b_i = 1 \mid y, h)}{p(b_i = 0 \mid y, h)} \quad \text{[Equation 13]}$$

Based on the LLR, the receiver may calculate mutual information as expressed in Equation 14. The mutual information is associated with an amount of information included in the received codeword and associated with $b_i$.

$$I(b_i; y, h) = 1 + p(b_i = 1 \mid y, h) \log p(b_i = 1 \mid y, h) + p(b_i = 0 \mid y, h) \log p(b_i = 0 \mid y, h) \quad \text{[Equation 14]}$$

Based on the LLR, the receiver may calculate a bit error probability as expressed in Equation 15.

$$p(E_i \mid y, h) \simeq H^{-1}(1 - I(b_i; y, h)) = \frac{1}{1 + \exp(|LLR(b_i \mid y, h)|)} \quad \text{[Equation 15]}$$

The above description may be generalized in an arbitrary fading channel and in a non-coherent channel, similarly.

(2) Feedback of Side Information

Based on the LLR, the mutual information $I(b_i; y, h)$ may be calculated with respect to each of $b_i (i=1, 2, \ldots, k)$. A receiver may feed back side information including the mutual information to a transmitter to enable the transmitter to determine an optimal transmission strategy, based on the side information.

For example, the receiver may feed back, to the transmitter, all mutual information $I(b_i; y, h)(i=1, 2, \ldots, k)$. In this example, the transmitter may determine an amount of additional redundant bits used to ensure a communication reliability. However, the feedback of all $I(b_i; y, h)(i=1, 2, \ldots, k)$ may be inefficient.

For example, the mutual information may be averaged as expressed by Equation 16, to reduce a feedback overhead.

$$I(y) = \frac{\sum_{i=1}^{k} I(b_i; y, h)}{k} \quad \text{[Equation 16]}$$

When the averaged mutual information $I(y)$ is fed back to the transmitter, the transmitter may determine an amount of information that is associated with the transmitted data and that is included in the receiver. In this example, $0 \leq I(y) \leq 1$.

As another example, a bit error probability may be averaged to reduce a feedback overhead of the side information. $p(E_i \mid y)$ may be expressed as a complex non-linear function based on a code structure and a Signal-to-Noise Ratio (SNR). In this example, the receiver may calculate bit error probabilities based on the LLR as described above, and may average the bit error probabilities to obtain an average bit error probability $F(y)$, as expressed in Equation 17.

$$F(y) = \frac{\sum_{i=1}^{k} p(E_i \mid y)}{k} = \frac{\sum_{i=1}^{k} \frac{1}{1 + \exp(|LLR(b_i \mid y)|)}}{k} \quad \text{[Equation 17]}$$

In Equation 17, a channel may be a channel of a vector Gaussian. Equation 17 may be extended in the fading channel.

When the receiver feeds back $F(y)$, the transmitter may recognize an average bit error probability $F(y)$ that is associated with a received codeword and is included in the receiver, based on $F(y)$. In this example, $0 \leq F(y) \leq 0.5$, and the average bit error probability, $F(y)$ may not be uniformly distributed in $[0, 0.5]$.

1) Feedback Scheme

When a receiver calculates an LLR with respect to each bit of a transmitted data packet, $I(y)$ and $F(y)$ may be calculated based on the calculated LLR. A principle of calculating $I(y)$ and $F(y)$ may be applied regardless of a channel model.

2) Feedback of Side Information Including Averaged Mutual Information

When I(y) is calculated, the receiver may quantize I(y) to obtain Î(y). The receiver may feed back bits corresponding to Î(y) to a transmitter. An optimal quantizer may not be uniform, because I(y) may not be uniform in [0, 1].

In this example, a single quantization point may be a point "1". For example, the point "1" may be fed back from the receiver to the transmitter when a received codeword is successively decoded or I(y) is greater than a predetermined target value $I_T \geq 0$. When the point "1" is fed back to the transmitter, the transmitter may determine that the receiver successively decoded the received codeword. When the point "1" is not fed back to the transmitter, the transmitter may transmit additional redundant bits to improve a reception quality of the receiver. For example, when the received codeword is not successively decoded or I(y) is less than or equal to $I_T \geq 0$, the receiver may feed back bits corresponding to Î(y) to the transmitter. The transmitter may determine the additional redundant bits based on the bits corresponding to Î(y) in order to further transmit the additional redundant bits.

3) Feedback of Side Information Including Average Bit Error Probability

A receiver may calculate F(y) and may quantize F(y) to obtain F̂(y). The receiver may feed back bits corresponding to a quantization point of F̂(y), to a transmitter. In this example, F(y) may not be uniform, thus, an optimal quantizer may not be uniform.

In this example, a single quantization point may be a point "0".

For example, the point "0" may be fed back from the receiver to the transmitter, when a received codeword is successively decoded or the average bit error probability F(y) is less than a predetermined target value $P_e \geq 0$. When the point "0" is fed back to the transmitter, the transmitter may determine that the receiver successively decoded the received codeword. When the point "0" is not fed back to the transmitter, the transmitter may further transmit additional redundant bits to improve a reception quality of the receiver. For example, when the received codeword is not successively decoded or F(y) is greater than equal to the predetermined target value $P_e \geq 0$, the receiver may feed back bits corresponding to F̂(y) to the transmitter. The receiver may determine additional redundant bits based on bits corresponding to F̂(y) to further transmit the additional redundant bits.

4) Feedback of Side Information Including Index of Refinement Code Recommended by a Receiver Side information generated and fed back by a receiver may include an index of a recommended refinement code in addition to mutual information, average mutual information, a bit error probability, and/or an average bit error probability. For example, the receiver may select one of various MCS levels based on a LLR, and may feed back information associated with the selected MSC level as the side information. For example, the information associated with the selected MSC level may indicate a recommended refinement code, a recommended modulation scheme, a coded scheme, and the like.

2. Re-Transmission Strategy in Pair of Single Transmitter and Single Receiver

A transmitter may receive side information fed back from a receiver. The transmitter may determine, based on the side information, an amount of additional redundant bits to be transmitted, to decrease an error probability to be lower than a target value. A reliability increased by the additional redundant bits may be dependent on a code structure, a codeword that is received by the receiver and is not known to the transmitter, a channel state, and the like. Accordingly, calculating the reliability may be complex. Therefore, there is desire for a simple method of calculating the reliability.

A successive transmission scheme that includes refinement codes $C_1, C_2, \ldots, C_I$ may be used. In this example, each of $C_{j+1}$ may refine a codebook that includes the refinement codes $C_1, C_2, \ldots, C_j$. Codebooks may be systematic.

The transmitter may encode 'b' using a systematic code $C_1$ to generate a codeword $c_1$ such that codewords corresponding to input bits $b=b_1 b_2 \ldots b_k$ may be generated. The codeword $c_1$ may be encoded as a codeword $c_2$ using a systematic code $C_2$. Similarly, $c_2$ may be encoded as a codeword $c_3$ using a systematic code $C_3$. Therefore, a codeword $c_j$ may be encoded as a codeword $c_{j+1}$ using a systematic code $C_{j+1}$.

To describe the re-transmission strategy, when side information including I(y) is fed back, the following may be assumed.

Example Where Transmitter Uses a Refinement Codebook

A transmitter may have a table with respect to a SNR, a bit error rate (BER), and average mutual information obtained by utilizing the systematic codes $C_1, \ldots, C_I$. The table may be obtained through an off-line simulation, and may be stored in a memory of the transmitter.

Example Where Transmitter Uses an Adaptive Modulation Coding (AMC) Table Including Various Modulation and Coding Scheme (MCS) Levels Used in Various Standards Each of the various MSC levels may define a corresponding modulation scheme, a corresponding encoding scheme, and a corresponding code rate. A transmitter may perform simulations to different code rates respectively corresponding to the MCS levels. Accordingly, the transmitter may have a table with respect to average mutual information, a BER, and an SNR. The table may be stored in advance. For example, the table may be obtained off-line, and may be stored in a memory of the transmitter.

In both examples where the transmitter uses a refinement codebook and the transmitter uses an AMC table, the transmitter may be aware of a target BER requested by the receiver.

When side information including F(y) is fed back, the following may be assumed.

Example Where the Transmitter Uses a Refinement Codebook

A transmitter may have a table with respect to a SNR, a BER, and average mutual information obtained by utilizing the systematic codes $C_1, \ldots, C_I$. The table may be stored in advance. The table may be obtained through an off-line simulation, and may be stored in a memory of the transmitter.

Example Where the Transmitter Uses an AMC Table that Includes Various MCS Levels Used in Various Standards Each of the various MSC levels may define a corresponding modulation scheme, a corresponding encoding scheme, and a corresponding code rate. The transmitter may perform simulations to different code rates respectively corresponding to the MCS levels. Accordingly, the transmitter may have a table with respect to average mutual information, a BER, and a SNR. The table may be stored in advance. The table may be obtained off-line, and may be stored in a memory of the transmitter.

In both examples where the transmitter uses a refinement codebook and the transmitter uses an AMC table, the transmitter may be aware of a target BER requested by the receiver.

1) Transmission Algorithm (1) Re-Transmission Strategy Using Side Information Including Average Mutual Information A. Example Where the Transmitter Uses a Refinement Codebook A transmitter may start transmission of a codeword $c_1$ in a first transmission. A receiver may receive the codeword $c_1$ as $y_1$. The receiver may calculate $I(y_1)$, and may feed back $\hat{I}(y_1)$ that is a quantized value of $I(y_1)$, as the side information. When $\hat{I}(y_1)=1$, the transmitter may determine that the receiver successively decoded the codeword $c_1$. Otherwise, the following operation may be performed.

First, the transmitter may make an approximation of $I(y_1)$. The transmitter may use a safety margin to correct the approximation of $I(y_1)$. The transmitter may subtract a previously optimized safety margin $d_2 \geq 0$ from an instantaneous $SNR_2$ of a second transmission.

Second, the transmitter may use a table that stores a BER, average mutual information, and a SNR with respect to a plurality of refinement codewords $C_2, \ldots, C_I$ to determine additional redundant bits, for example, to determine an optimal refinement codeword to be used in the second transmission. The transmitter may detect a minimum value, $j_{min}$, which enables a BER corresponding to a refinement code $C_j$ to be smaller than a predetermined target value $P_e$, with respect to $SNR_2-d_2$ and $\hat{I}(y_1)$ given in the table.

Third, the refinement codes may be systematic, and the codeword $c_1$ may appear ahead of $c_{j_{min}}$. A portion ahead of $c_{j_{min}}$ may be filled with the codeword $c_1$. Accordingly, the transmitter may determine bits or symbols existing in $c_{j_{min}}$, as the additional redundant bits or symbols.

When the transmitter transmits $c_{j_{min}}$ in the second transmission, a codeword received by the receiver may be expressed as $y_{j_{min}}$. For example, when the transmitter transmits $c_{j_{min}}$ in the second transmission, the transmitter may transmit the additional redundant bits that are a portion of $c_{j_{min}}$, in the second transmission. The codeword $c_1$ may be changed into $c_{j_{min}}$, $y_1$ may be changed into $y_{j_{min}}$, and the above described transmission and reception scenario may be performed again.

B. Example Where the Transmitter Uses an AMC Table that Includes Various MCS Levels Used in Various Standards The transmitter may determine an MCS level from among the various MCS levels in the AMC table, and may transmit a codeword $c_1$ that has a highest code rate to start a transmission. The code word $c_1$ may be received by the receiver as $y_1$. The receiver may calculate $I(y_1)$, and may feed back $\hat{I}(y_1)$ that is a quantized value of $I(y_1)$, as the side information. When $\hat{I}(y_1)=1$, the transmitter may determine that the receiver successively decodes $c_1$. Otherwise, the following operation may be performed.

First, the transmitter may make an approximation of $I(y_1)$. The transmitter may use a safety margin to correct the approximation of $I(y_1)$. The transmitter may subtract a previously optimized safety margin $d_2 \geq 0$ from a instantaneous $SNR_2$ of a second transmission.

Second, the transmitter may use a table storing a BER, average mutual information, and a SNR with respect to a code rate $Rate_2, Rate_3, \ldots, Rate_I$ to determine additional redundant bits, for example, to determine an optimal code rate $Rate_j$ to be used in the second transmission. The transmitter may detect a minimum value, $j_{min}$, which enables a BER corresponding to the optimal code rate $Rate_j$ to be smaller than a predetermined target value $P_e$, with respect to $SNR_2-d_2$ and $\hat{I}(y_1)$ given in the table.

Third, the refinement codes may be systematic. The codeword $c_1$ may appear ahead of $c_{j_{min}}$. A portion ahead of $c_{j_{min}}$ may be filled with the codeword $c_1$. Accordingly, the transmitter may determine bits or symbols that exist in a portion of back of $c_{j_{min}}$, as the additional redundant bits or symbols.

When the transmitter transmits $c_{j_{min}}$ in the second transmission, a codeword received by the receiver may be expressed as $y_{j_{min}}$. For example, when the transmitter transmits $c_{j_{min}}$ in the second transmission, the transmitter transmits additional redundant bits that are a portion of $c_{j_{min}}$, in the second transmission. The codeword $c_1$ may be changed again into $c_{j_{min}}$, $y_1$ may be changed into $y_{j_{min}}$, and the above described transmission and reception scenario may be performed again. The transmitter may repeatedly perform the described process until a request of the receiver, with respect to average mutual information, is satisfied or the described process fails.

(2) Re-Transmission Strategy Using Side Information Including Average Bit Error Probability A. Example Where a Transmitter Uses a Refinement Codebook A transmitter starts transmission of a codeword $c_1$ in a first phase. A receiver may receive the codeword $c_1$ as $y_1$. The receiver may calculate $F(y_1)$, and may feed back $\hat{F}(y_1)$ that is a quantized value of $F(y_1)$, as the side information. When $\hat{F}(y_1)=0$, the transmitter may determine that the receiver successively decoded the codeword $c_1$. Otherwise, the following operation may be performed.

First, the transmitter may make an approximation of $F(y_1)$. The transmitter may use a safety margin to correct the approximation of $F(y_1)$. The transmitter may subtract a previously optimized safety margin $d_2 \geq 0$ from an instantaneous $SNR_2$ of a second transmission.

Second, the transmitter may use a table storing a BER, average mutual information, and a SNR with respect to each of refinement codewords $C_2, \ldots, C_I$ to determine additional redundant bits, for example, to determine an optimal refinement codeword to be used in the second transmission. The transmitter may detect a minimum value, $j_{min}$, which enables a BER corresponding to a refinement code $C_j$ to be smaller than a predetermined target value $P_e$, with respect to $SNR_2-d_2$ and $\hat{I}(y_1)$ given in the table.

Third, the refinement codes may be systematic. The codeword $c_1$ may appear ahead of $c_{j_{min}}$. A portion ahead of $c_{j_{min}}$ may be filled with the codeword $c_1$. Accordingly, the transmitter may determine bits or symbols that exist in a portion of $c_{j_{min}}$, as the additional redundant bits or symbols.

When the transmitter transmits $c_{j_{min}}$ in the second transmission, a codeword received by the receiver may be expressed as $y_{j_{min}}$. For example, when the transmitter transmits $c_{j_{min}}$ in the second transmission, the transmitter may transmit additional redundant bits that are a portion of $c_{j_{min}}$, in the second transmission. The codeword $c_1$ may be changed again into $c_{j_{min}}$, $y_1$ may be changed into $y_{j_{min}}$, and the above described transmission and reception scenario may be performed again.

The transmitter may repeatedly perform the described process until a request of a receiver, with respect to average mutual information, is satisfied or the described process fails.

B. Example Where Transmitter Uses an AMC Table that Includes Various MCS Levels Used in Various Standards A transmitter may determine a MCS level from among the various MCS levels in the AMC table, and may transmit a codeword $c_1$ that has a highest code rate to start a transmission. The code word $c_1$ may be received by a receiver as $y_1$. The receiver may calculate $F(y_1)$, and may feed back $\hat{F}(y_1)$ that is a quantized value of $F(y_1)$ as the side information. When $\hat{F}(y_1)=0$, the transmitter may determine that the receiver successively decoded $c_1$. Otherwise, the following operation may be performed.

First, the transmitter may make an approximation of $F(y_1)$. The transmitter may use a safety margin to correct the approximation of $F(y_1)$. The transmitter may subtract a previously optimized safety margin $d_2 \geq 0$ from an instantaneous $SNR_2$ of a second transmission.

Second, the transmitter may use a table storing a BER, average mutual information, and a SNR with respect to a code rate $Rate_2, Rate_3, \ldots, Rate_I$ to determine additional redundant bits, for example, to determine an optimal code rate $Rate_j$ to be used in the second transmission. The transmitter may detect a minimum value, $j_{min}$, which enables a BER corresponding to the optimal code rate $Rate_j$ be smaller than a predetermined target value $P_e$, with respect to $SNR_2-d_2$ and $F(y_1)$ given in the table.

Third, the refinement codes may be systematic. The codeword $c_1$ may appear ahead of $c_{j_{min}}$. A portion ahead of $c_{j_{min}}$ may be filled with the codeword $c_1$. Accordingly, the transmitter may determine bits or symbols existing in a portion of back of $c_{j_{min}}$, as the additional redundant bits or symbols.

When the transmitter transmits $c_{j_{min}}$ in the second transmission, a codeword received by the receiver may be expressed as $y_{j_{min}}$. For example, when the transmitter transmits $c_{j_{min}}$ in the second transmission, the transmitter may transmit additional redundant bits which are a portion of $c_{j_{min}}$, in the second transmission. The codeword $c_1$ may be changed again into $c_{j_{min}}$, $y_1$ may be changed into $y_{j_{min}}$, and the above described transmission and reception scenario may be performed again. The transmitter may repeatedly perform the described process until a request of the receiver, with respect to average mutual information, is satisfied or the described process fails.

The above description relates to examples where the transmitter calculates and determines redundant bits. The additional redundant bits may be calculated or determined by the receiver. The receiver may store the described tables, and may calculate or determine additional redundant bits used for successively performing a decoding based on the tables. In this example, the receiver may generate side information that includes an index of a recommended refinement code or an index of a code rate recommended from an AMC Table, instead of generating side information that includes average mutual information and average bit error probability. Further, the side information may include information associated with a request of a receiver for successively decoding packet data.

Figure 2:
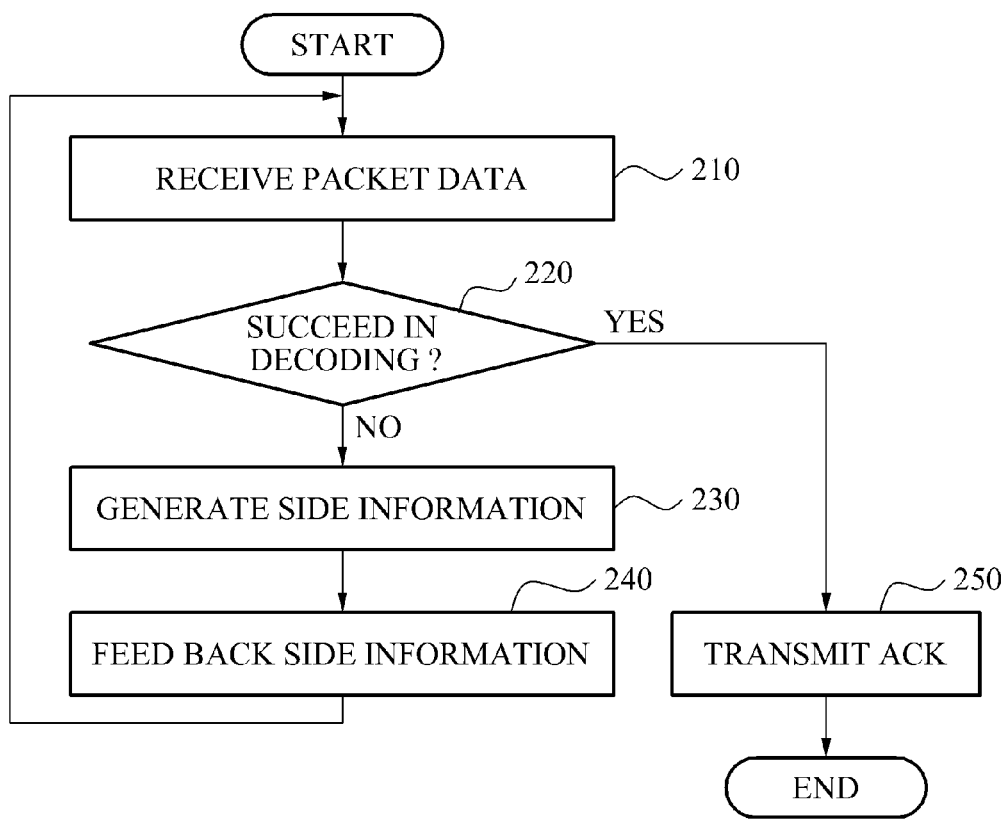
FIG. 2 is a flowchart illustrating an example of a communication method of a receiver.

FIG. 2 illustrates an example of a communication method of a receiver.

Referring to FIG. 2, the receiver receives packet data transmitted from a transmitter, in 210.

The transmitter may encode k input bits $b_1 b_2 \ldots b_k$ to transmit packet data $c=c_1 c_2 \ldots c_n$ that is a codeword that has a length of n. In this example, the packet data received by the receiver, namely the codeword having the length of n, may be expressed as $y=y_1 y_2 \ldots y_n$.

The receiver may decode the received packet data $y=y_1 y_2 \ldots y_n$, and may determine whether the decoding is successively performed, in 220. When the decoding of the received packet data $y=y_1 y_2 \ldots y_n$ is successively performed, $b_1 b_2 \ldots b_k$ may be successively detected.

When the receiver fails in the decoding, the receiver may generate side information indicating an amount of information that is associated with the transmitted packet data $c=c_1 c_2 \ldots c_n$ and that is included in the received packet data $y=y_1 y_2 \ldots y_n$, in 230

Although the receiver fails in the decoding, discarding all of the received packet data $y=y_1 y_2 \ldots y_n$ may be inefficient. Information indicating an amount of information that is associated with the transmitted packet data $c=c_1 c_2 \ldots c_n$ and that is included in the received packet data $y=y_1 y_2 \ldots y_n$ received by the receiver, may be useful to the transmitter. Therefore, the receiver may generate side information indicating an amount of the information that is associated with the transmitted packet data $c=c_1 c_2 \ldots c_n$ and that is included in the received packet data $y=y_1 y_2 \ldots y_n$.

As described above, the receiver may generate the side information based on an LLR of each bit of received packet data. For example, the receiver may calculate, based on the LLR, mutual information, average mutual information, a bit error probability, and/or average bit error probability. The receiver may generate side information that includes the bit error probability or the average bit error probability in addition to the mutual information or the average mutual information.

The receiver may generate side information including an index of a recommended refinement code. The receiver may select a MCS level from among various MCS levels, and may feed back information associated with the selected MCS as the side information. In this example, the information associated with the selected MCS level may indicate a recommended refinement code, a recommended modulation scheme, an encoding scheme, and the like.

When the side information is generated, the receiver feeds back the side information to the transmitter, in 240.

The receiver may compare a value, such as $I(y_1)$, $F(y_1)$, and the like, corresponding to the side information with a predetermined value, and may perform feedback based on a comparison result. For example, when $I(y_1)$ is greater than the predetermined value or $F(y_1)$ is less than the predetermined value, the receiver may not feed back the side information.

The transmitter may determine a subsequent code rate, a subsequent refinement code, or a subsequent MCS level based on the side information in order to generate additional redundant bits. For example, when the receiver needs additional redundant bits in 'x' bits for a successful decoding, the transmitter may use side information that is fed back, and thus may promptly generate the additional redundant bits in 'x' bits compared with an incremental redundancy scheme. The transmitter may recognize an amount of information that is associated with the transmitted packet data and that is included in the received packet data received by the receiver, and thus, may promptly and effectively generate the additional redundant bits.

When the receiver succeeds in the decoding, the receiver transmits an ACK to the transmitter, in 250. In this example, the successful decoding indicates that the receiver obtains a BER lower than a predetermined level.

Figure 3:
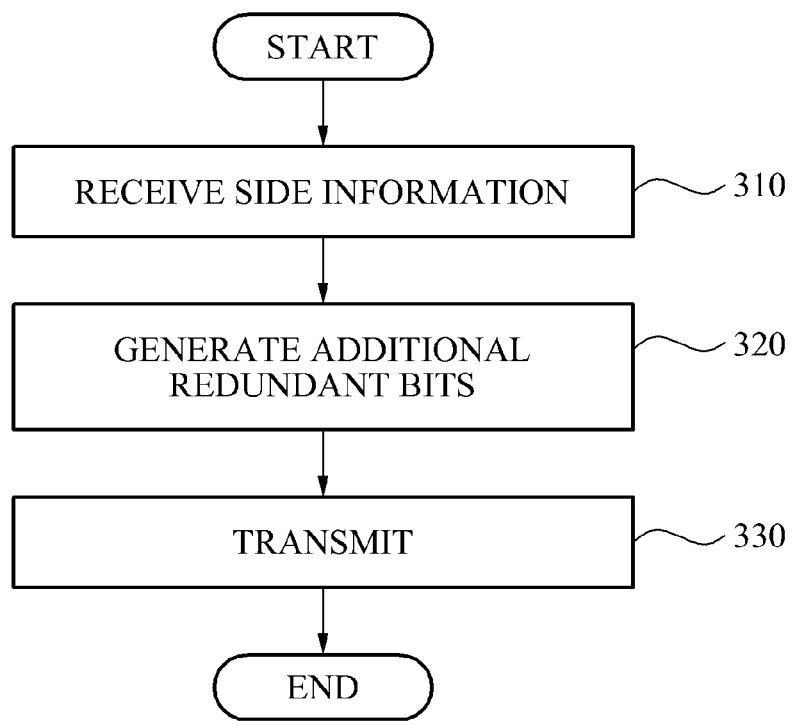
FIG. 3 is a flowchart illustrating an example of a communication method of a transmitter.

FIG. 3 illustrates an example of a communication method of a transmitter.

Referring to FIG. 3, the transmitter receives side information fed back by a receiver, in 310. The side information has been described above, and thus, descriptions thereof are omitted.

The transmitter generates additional redundant bits based on the side information, in 320. The transmitter may recognize, based on the side information, an amount of additional redundant bits to be used by the receiver, and thus may effectively generate the additional redundant bits.

The transmitter transmits the additional redundant bits to the receiver, in 330. Operations 310 through 320 may be repeated until the transmitter receives the ACK from the receiver.

3. Re-Transmission Strategy in Wireless Multi-Hop Mesh Network Performing Network Coding Hereinafter, a strategy using the described side information to provide an effective network coding protocol is described.

Figure 4:
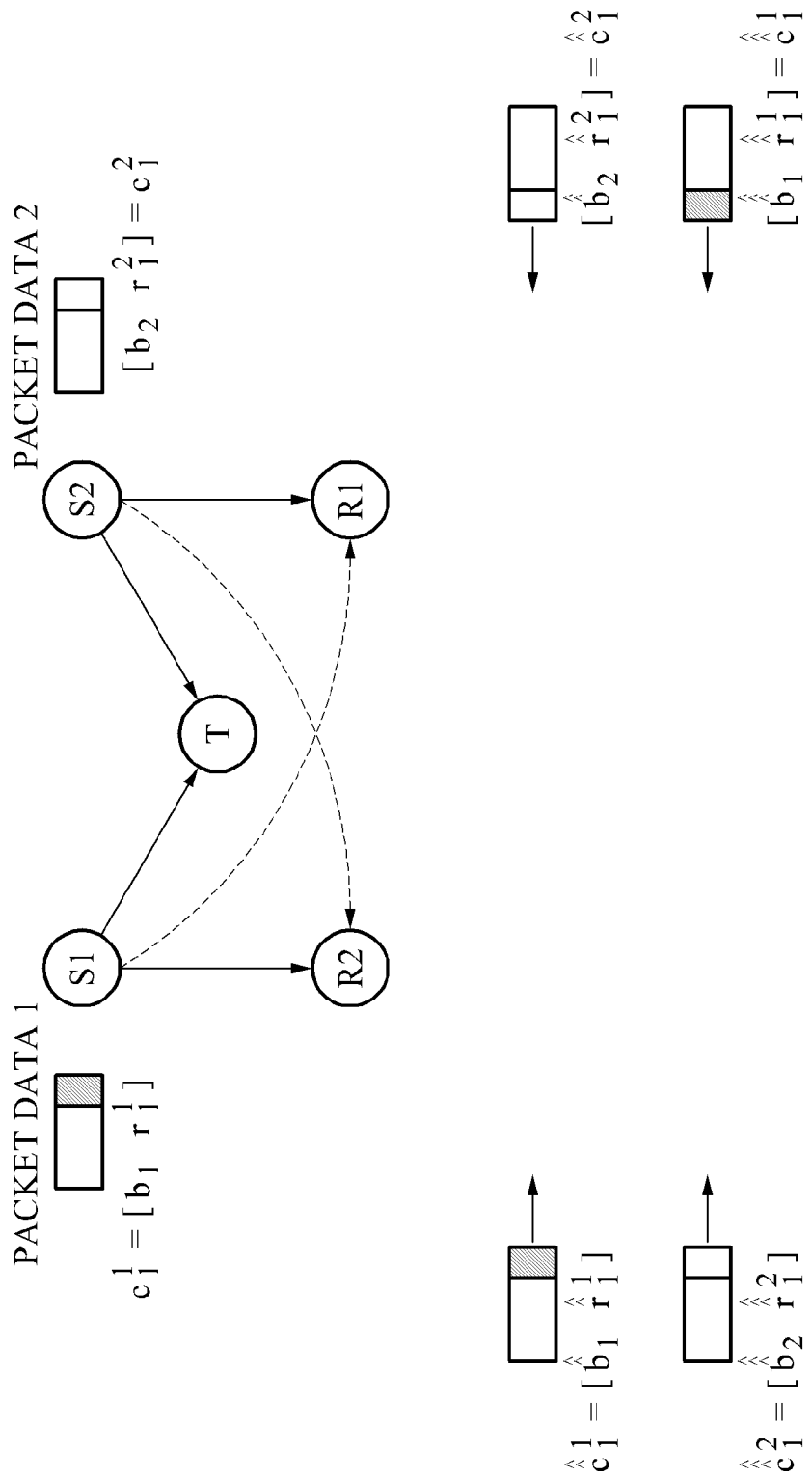
FIG. 4 is a diagram illustrating an example of a wireless network performing a network coding in a first phase.
Figure 5:
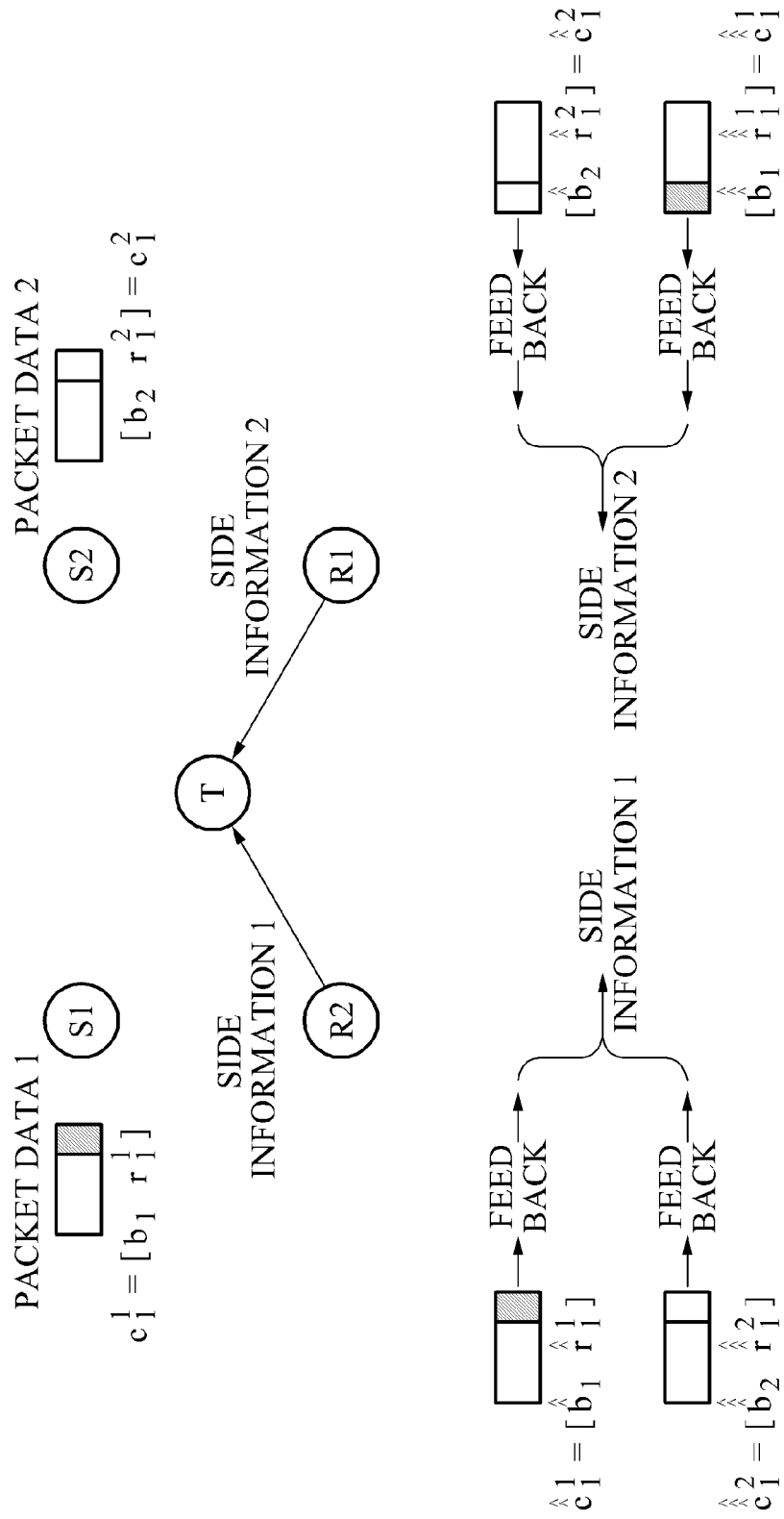
FIG. 5 is a diagram illustrating an example of a wireless network performing a network coding in a second phase.
Figure 6:
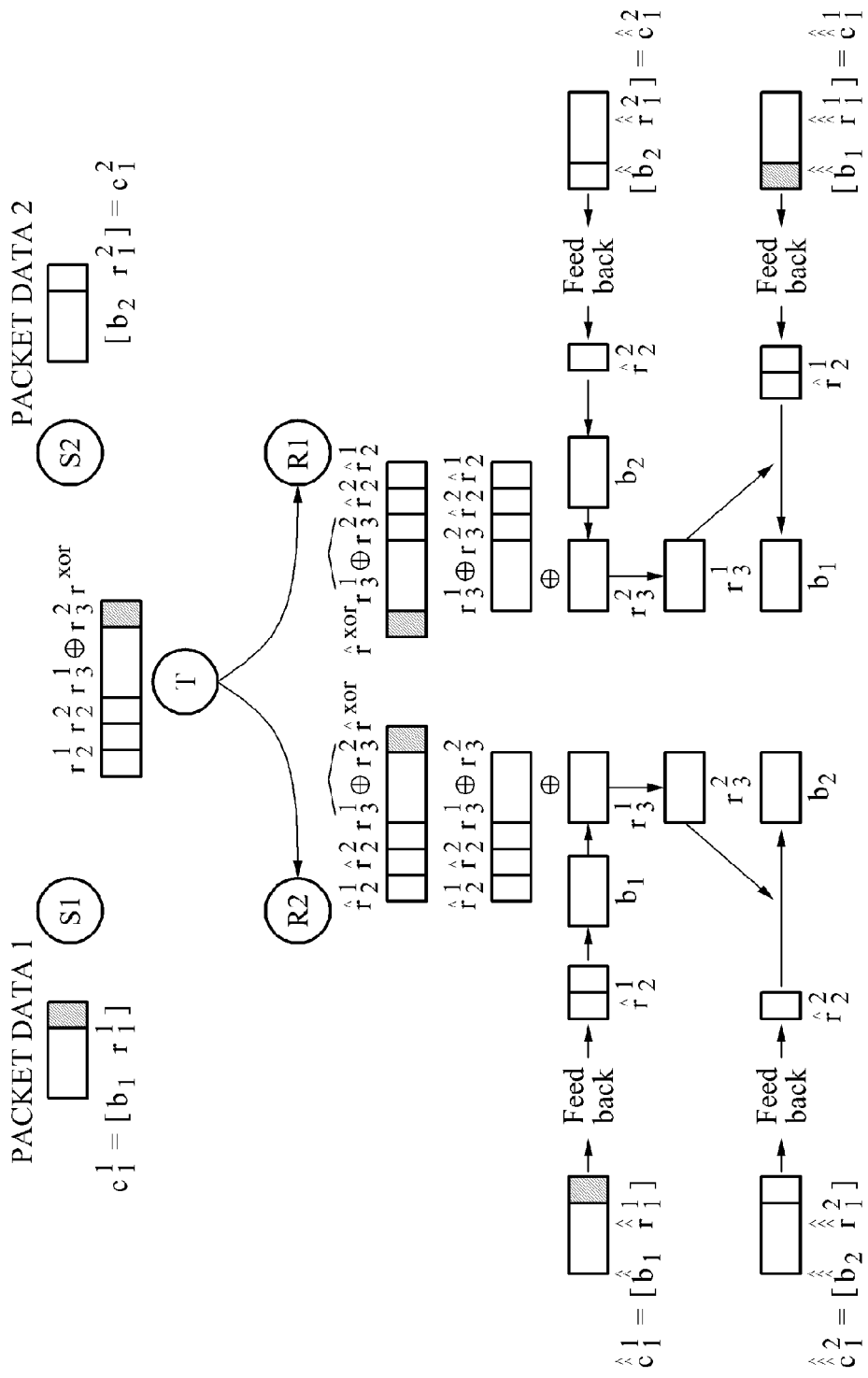
FIG. 6 is a diagram illustrating an example of a wireless network performing a network coding in a third phase.

FIGS. 4 through 6 illustrate an example of a wireless network performing a network coding in a first phase, a second phase, and a third phase, respectively.

Referring to FIGS. 4 through 6, a transmitter 1 (S1) and a receiver 1 (R1) may construct a single pair, and a transmitter 2 (S2) and a receiver 2 (R2) may construct another single pair. A relay station (T) may be included between the two pairs. For ease of description, it is assumed that T is located in a center of a square constructed by S1, S2, R1, and R2.

(1) Example where R1 is located outside a transmission range of S1, R2 is located outside a transmission range of S2, and T is located in a transmission range of S1 and S2

In this example, S1, S2, and T use binary refinement codes $C_1, C_2, \ldots, C_l$ for successive re-transmission. S1 and S2 may be aware of channel information associated with a channel to T. Also, S1 and S2 respectively may decode $b^1$ and $b^2$ into $c_1^1$ and $c_1^2$ based on a refinement code $C_1$ to enable T to successively perform a decoding, and transmit $c_1^1$ and $c_1^2$. When S1 and S2 complete the transmission, subsequent operations may be operated as follows.

T may report that $b^1$ and $b^2$ are decoded without an error to S1 and S2.

R1 may transmit side information associated with the received $c_1^2$ to T.

When additional redundant bits corresponding to $c_2^2$ need to be transmitted for R1 to successively decode $b^2$, T may recognize the additional redundant bits corresponding to $c_2^2$ based on the side information. For example, $c_2^2$ may be a codeword generated by refining $c_1^2$ based on a refinement code $C_2$.

R2 may transmit side information associated with the received $c_1^1$ to T. When additional redundant bits corresponding to $c_2^1$ need to be transmitted for R2 to successively decode $b^1$, T may recognize the additional redundant bits corresponding to $c_2^1$ based on the side information. For example, $c_2^1$ may be a codeword generated by refining $c_1^1$ based on the refinement code $C_2$.

In an example where T is not able to use the side information and may only perform algebraic operation, and both R1 and R2 fail to successively perform the decoding, T may only transmit information generated by encoding a finite field combination of $b^1$ and $b^2$. When T is able to use the side information, T may transmit only following additional redundant bits and XOR addition of $b^1$ and $b^2$.

Additional Redundant Bits

Remaining symbols that are excluded from $c_2^1$ through $c_1^1$
Remaining symbols that are excluded from $c_2^2$ through $c_1^2$
XOR addition of $b^1$ and $b^2$ When an operation, for example, a '(binary+real number)+binary' operation, satisfies a commutativity, and there is a method of enabling '(binary+real number)+binary' operation to be the same as a '(binary+binary)+real number' operation, redundant bits used for preserving the XOR addition of $b^1$ and $b^2$ may not be transmitted. Conversely, in a different condition, the redundant bits used for preserving the XOR addition may be needed.

In this example, it is assumed that T is aware of channel information associated with a channel to R1 and channel information associated with a channel to R2, and T is aware of an appropriate amount of redundant bits to be transmitted. When T is not aware of the appropriate amount, T may transmit overestimated redundant bits, and thus, a surplus amount of redundant bits may be transmitted.

A process of decoding in R1 is described below.

A. Example where an operation, such as a '(binary+real number)+binary' operation, satisfies a commutativity, and there is a method of enabling a '(binary+real number)+binary' operation to be the same as a '(binary+binary)+real number' operation.

R1 may decode a noisy version of XOR addition of received $b^1$ and $b^2$ based on redundant bits for preserving the XOR addition. When R1 receives $c_2^2$, R1 may successively decode $b^2$. R1 may perform, based on $b^2$, an XOR of the XOR addition of the decoded $b^1$ and $b^2$ to recognize $b^1$. Accordingly, R1 may successively decode $b^1$ based on received $b^1$ and received $c_2^1$ that is already included in R1.

B. Example Where Redundant Bits for Preserving XOR Addition are Added

When R1 receives $c_2^2$, R1 may successively decode $b^2$. R1 may perform, based on $b^2$, an XOR of the XOR addition of received $b^1$ and $b^2$ to recognize $b^1$.

A process of decoding in R2 is performed in the same manner as the process of decoding in R1.

(2) Example Where all R1, R2, and T are Included in Transmission Range of S1 and S2.

In this example, S1, S2, and T may use binary refinement codes $C_1, C_2, \ldots, C_l$ for successive re-transmission when R1, R2, and T are all located in the transmission range of S1 and S2. S1 and S2 may be aware of channel information associated with a channel to T. Also, S1 and S2 respectively encode $b^1$ and $b^2$ into $c_1^1$ and $c_1^2$ based on a refinement code $C_1$ to enable T to successively perform a decoding, and transmit $c_1^1$ and $c_1^2$. When S1 and S2 complete the transmission, subsequent operations may be operated as follows.

T may report, to S1 and S2, that $b^1$ and $b^2$ are decoded without an error.

R1 may transmit, to T, side information associated with each of received $c_1^1$ and $c_1^2$. In this example, R1 is closer to S2 than to S1, and thus, a quality of a codeword received from S2 is better than a quality of a codeword received from S1. The additional redundant bits corresponding to $c_3^1$ and $c_2^2$ need to be transmitted for R1 to successively decode $b^1$ and $b^2$. In this example, $c_3^1$ and $c_2^2$ may be codewords generated by refining $c_1^1$ and $c_1^2$ based on refinement codes $C_3$ and $C_2$.

R2 may transmit, to T, side information associated with two codewords $c_1^1$ and $c_1^2$. In this example, R2 is closer to S1 than to S2, and thus, a quality of a codeword received from S1 is better than a quality of a codeword received from S2. The additional redundant bits corresponding to $c_2^1$ and $c_3^2$ need to be transmitted for R1 to successively decode $b^1$ and $b^2$. In this example, $c_2^1$ and $c_3^2$ may be codewords generated by refining $c_1^1$ and $c_1^2$ based on refinement codes $C_2$ and $C_3$.

In an example where T is not able to use the side information and may only perform an algebraic operation, and when both R1 and R2 fail to successively perform the decoding, T may only transmit information generated by encoding a finite field combination of $b^1$ and $b^2$. When T is able to use the side information, T may transmit only following additional redundant bits and XOR addition of $b^1$ and $b^2$.

Additional redundant bits

Remaining symbols that are excluded from $c_2^1$ through $c_1^1$
Remaining symbols that are excluded from $c_2^2$ through $c_1^2$
XOR addition of remaining symbols that are excluded from $c_3^1$ through $c_2^1$ and remaining symbols that are excluded from $c_3^2$ through $c_2^2$ When an operation, such as a '(binary+real number)+binary' operation, satisfies a commutativity, and there is a method of enabling a '(binary+real number)+binary' operation to be the same as a '(binary+binary)+real number' operation, redundant bits ($r^{XOR}$) used for preserving the XOR addition may not be transmitted. Conversely, in a different condition, the redundant bits used for preserving the XOR addition may be needed.

In this example, it is assumed that T is aware of channel information associated with a channel to R1 and channel information associated with a channel to R2, and T is aware of an appropriate amount of redundant bits to be transmitted. When T is not aware of the appropriate amount, T may transmit overestimated redundant bits, and thus, a surplus amount of redundant bits may be transmitted.

A process of decoding in a receiver R1 is described below.

A. Example where an operation, such as a '(binary+real number)+binary' operation, satisfies a commutativity, and there is a method of enabling a '(binary+real number)+binary' operation to be the same as a '(binary+binary)+real number' operation.

When R1 receives $c_2{}^2$, R1 may successively decode $b^2$. R1 may calculate $c_3{}^2$, based on $b^2$, and R1 may perform an XOR of remaining symbols of $c_3{}^2$ and the described XOR addition, to recognize remaining symbols that are excluded from $c_3{}^1$ through $c_2{}^1$. R1 may already include $c_2{}^1$ and $c_1{}^1$, and thus, R1 may successively decode $b^1$ based on $c_1{}^1$, $c_2{}^1$, and $c_3{}^1$, that are three redundancies.

B. Example Where Redundant Bits for Preserving XOR Addition are Added

R1 may decode a noisy version of received XOR addition based on redundant bits for preserving the XOR addition. When R1 receives $c_2{}^2$, R1 may successively decode $b^2$. R1 may calculate $c_3{}^2$, based on $b^2$, and R1 may perform an XOR of remaining symbols of $c_3{}^2$ and the described XOR addition, to recognize remaining symbols that are excluded from $c_3{}^1$ through $c_2{}^1$. R1 may already include $c_2{}^1$ and $c_1{}^1$, and thus, R1 may successively decode $b^1$ based on $c_1{}^1$, $c_2{}^1$, and $c_3{}^1$, that are three redundancies.

A process of decoding in R2 is performed in the same manner as the process of decoding in R1.

Figure 7:
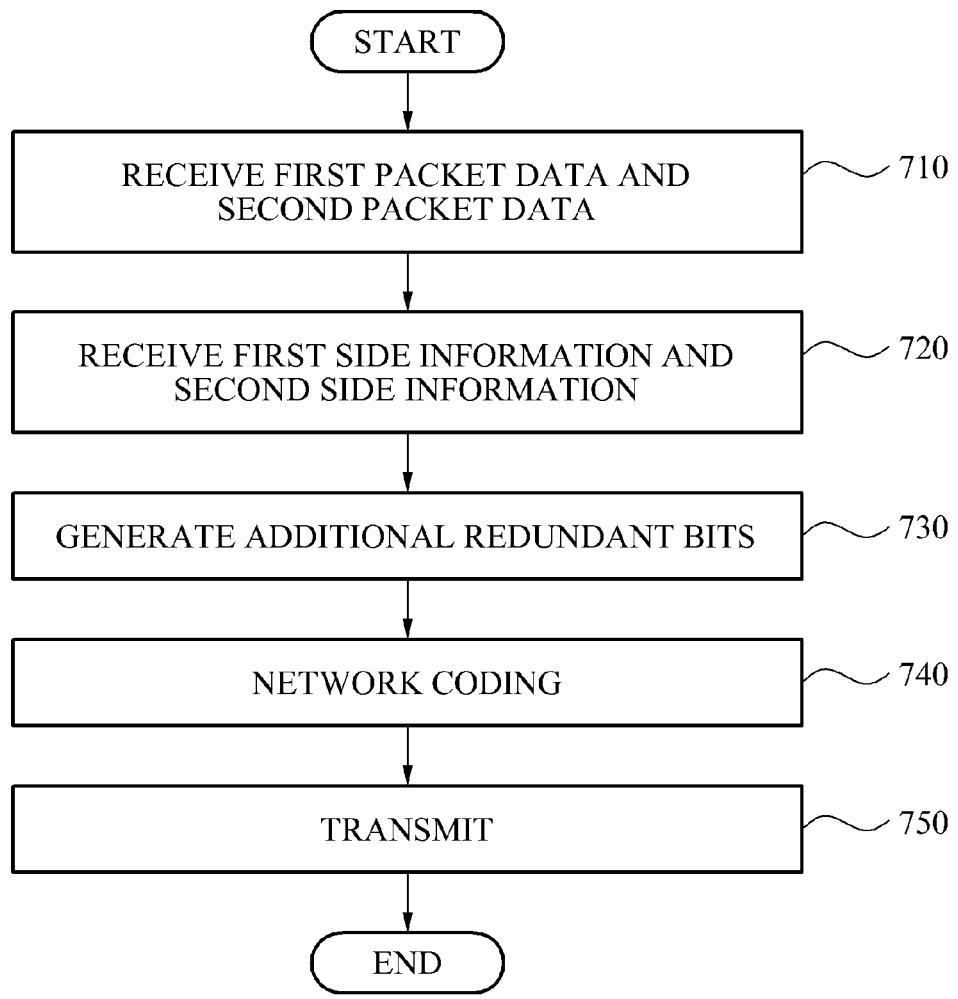
FIG. 7 is a diagram illustrating an example of a communication method of a relay in a wireless network performing a network coding.

FIG. 7 illustrates an example of a communication method of a relay in a wireless network performing a network coding.

Referring to FIG. 7, a network includes a first transmitter and a first receiver, a second transmitter and a second receiver, and a relay station performing a network coding. The relay station may receive first packet data from the first transmitter, and may receive second packet data from the second transmitter in the network, in 710.

In this example, the first receiver may generate and feed back first side information. The first side information indicates an amount of information that is associated with first data transmitted from the first transmitter and that is included in first packet data received by the first receiver, or indicates an amount of information that is associated with second packet data transmitted from the second transmitter and that is included in second packet received by the first receiver. The second receiver may generate and feed back second side information. The second side information indicates an amount of information that is associated with first data transmitted from the first transmitter and that is included in first packet data received by the second receiver, or indicates an amount of information that is associated with second packet data transmitted from the second transmitter and that is included in second packet received by the second receiver.

The relay station receives the first side information fed back from the first receiver and the second side information fed back from the second receiver, in 720.

The relay station generates additional redundant bits for the first receiver and additional redundant bits for the second receiver based on the first side information and the second side information, in 730.

In this example, the relay station may determine the additional redundant bits that the first receiver uses for decoding the first packet data and the second packet data, and may determine the additional redundant bits that the second receiver uses for decoding the first packet data and the second packet data, based on the first side information and the second side information, in order to generate the additional redundant bits for the first receiver and the second receiver.

The relay station may select at least one code corresponding to the first side information and the second side information based on a refinement codebook including systematic codes. The relay station may use the at least one code to generate the additional redundant bits for the first receiver and the additional redundant bits for the second receiver.

The relay station performs a network coding of the additional redundant bits for the first receiver and the additional redundant bits for the second receiver, in 740.

The relay station transmits or broadcasts the additional redundant bits and the network coded additional redundant bits, in 750.

The method according to the above-described example embodiments may be recorded in computer-readable storage media including program instructions to implement various operations embodied by a computer. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and computer-readable codes or program instructions may be stored and executed in a decentralized manner.

Figure 8:
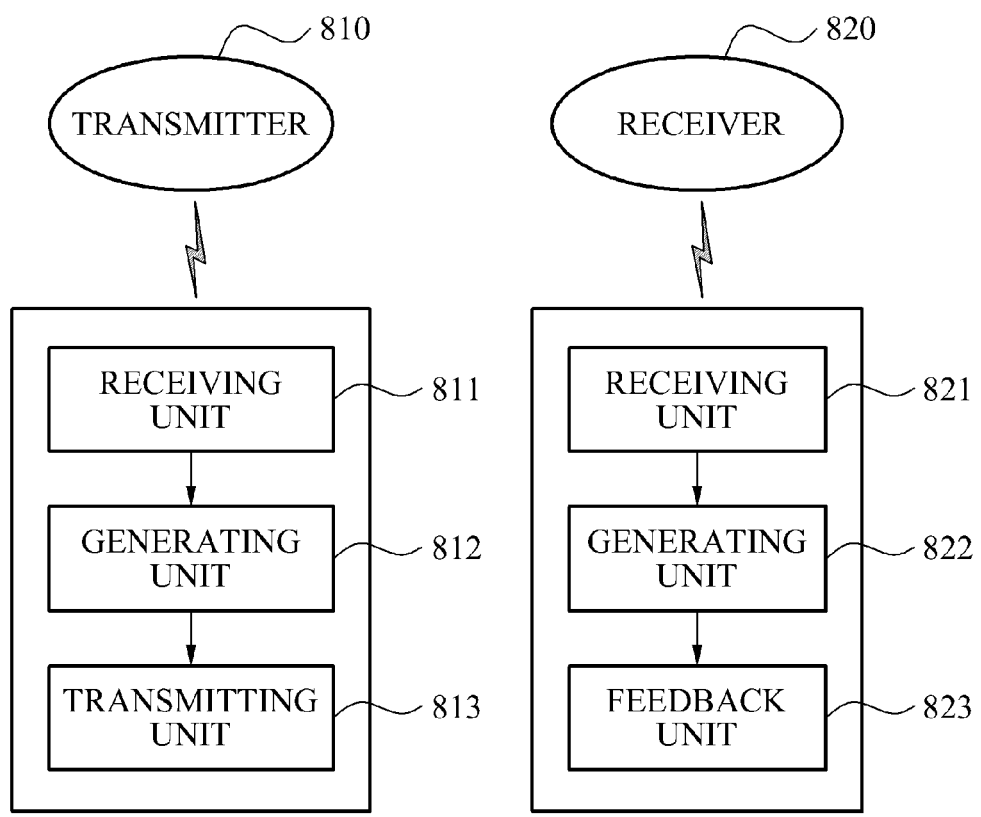
FIG. 8 is a diagram illustrating an example of a transmitter and a receiver.

FIG. 8 illustrates an example of a transmitter and a receiver.

Referring to FIG. 8, transmitter 810 includes a receiving unit 811, a generating unit 812, and a transmitting unit 813, and receiver 820 includes a receiving unit 821, a generating unit 822, and a feedback unit 823.

The receiving unit 811 may receive side information fed back from the receiver 820, and the side information indicates an amount of information that is associated with packet data transmitted from the transmitter 810 and that is included in packet data received by the receiver.

The generating unit 812 may generate additional redundant bits based on the side information.

The transmitting unit 813 may transmit the additional redundant bits to the receiver 820.

The receiver 821 may receive the packet data transmitted from the transmitter 810.

The generating unit 822 may generate side information indicates an amount of information that is associated with the transmitted packet data and that is included in the received packet data.

The feedback unit 823 may feed back the side information to the transmitter 810.

The above description may be applied to the transmitter 810 and the receiver 820, and thus, a description thereof will be omitted.

According to various examples, a receiver may feed back, to a transmitter, side information that is associated with transmitted packet data that is received by the receiver in order to increase efficiency of radio resources and to improve a quality of a signal, even when the receiver fails to successively decode the received packet data. Accordingly, the performance of a radio network may be improved.

As a non-exhaustive illustration only, the terminal device, transmitter, and receiver, described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a receiver, the method comprising:
   receiving packet data transmitted from a transmitter, the transmitted packet data comprising at least one redundant bit;
   generating side information indicating a similarity between the transmitted packet data and the received packet data, and further indicating to the transmitter to increase the amount of redundant bits included in the at least one redundant bit by an amount of bits determined based on the similarity between the transmitted packet data and the received packet data; and
   feeding back the side information.

2. The method of claim 1, wherein the generating of the side information comprises generating the side information based on a Log Likelihood Ratio (LLR) with respect to each bit of the received packet data.

3. The method of claim 1, wherein the side information comprises mutual information between the transmitted packet data and the received packet data, or a bit error probability corresponding to the received packet data, or an index of a refinement code recommended by the receiver, or any combination thereof.

4. The method of claim 3, wherein the generating of the side information comprises averaging the mutual information or the bit error probability.

5. The method of claim 3, wherein the generating of the side information comprises calculating the bit error probability based on the mutual information.

6. The method of claim 1, wherein the side information comprises information that is associated with the transmitted packet data and that is included in the received packet data, or information associated with a request of the receiver to successively decode the received packet data.

7. The method of claim 6, wherein a code rate of the transmitted packet data, or a refinement code of the transmitted packet data, or any combination thereof is determined based on the side information.

8. The method of claim 1, wherein the feeding back of the side information comprises feeding back the side information based on whether the received packet data is successively decoded or based on whether a value corresponding to the side information is greater than a predetermined value.

9. The method of claim 1, wherein the similarity between the transmitted packet data and the received packet data comprises mutual information between the transmitted packet data and the received packet data that is determined based on posteriori probabilities of the transmitted packet data and the received packet data.

10. The method of claim 9, wherein the generating of the side information comprises averaging the mutual information.

11. The method of claim 1, wherein the side information comprises a bit error probability corresponding to the received packet data that is determined based on posteriori probabilities of the transmitted packet data and the received packet data.

12. The method of claim 11, wherein the generating of the side information comprises averaging the bit error probability.

13. The method of claim 1, wherein the feeding back of the side information comprises feeding back the side information based on whether a value corresponding to the side information is greater than a predetermined value.

14. The method of claim 1, wherein the side information indicates to the transmitter an additional amount of redundant bits needed to complete successful decoding of the received packet data.

15. A communication method of a transmitter, the method comprising:
   transmitting packet data including at least one redundant bit to a receiver;
   receiving side information fed back from the receiver, the side information indicating a similarity between transmitted packet data transmitted from the transmitter and received packet data received by the receiver, and further indicating to the transmitter to increase the amount of redundant bits included in the at least one redundant bit by an amount of bits determined based on the similarity between the transmitted packet data and the received packet data;
determining an additional amount of redundant bits based on the side information; and
transmitting the additional redundant bits to the receiver.

16. The method of claim 15, wherein the generating of the additional redundant bits comprises:
selecting at least one code corresponding to the side information based on a refinement code comprising systematic codes; and
utilizing the at least one code to generate the additional redundant bits.

17. The method of claim 16, wherein the utilizing of the at least one code comprises:
generating coded packet data based on the at least one code; and
extracting the additional redundant bits from the coded packet data.

18. The method of claim 15, wherein the generating of the additional redundant bits comprises:
selecting a Modulation and Coding scheme (MCS) corresponding to the side information based on a table with respect to a plurality of MCSs; and
utilizing the selected MSC to generate the additional redundant bits.

19. The method of claim 15, wherein the side information comprises mutual information between the transmitted packet data and the received packet data, or a bit error probability corresponding to the received packet data, or an index of a refinement code recommended by the receiver, or any combination thereof.

20. The method of claim 15, wherein the transmitting of the additional redundant bits comprises transmitting the additional redundant bits without transmitting packet data.

21. A communication method of a relay station in a network comprising a pair of a first transmitter and a first receiver, a pair of a second transmitter and a second receiver, and the relay station performing network coding, the method comprising:
receiving first packet data broadcasted from the first transmitter and second packet data broadcasted from the second transmitter;
receiving first side information fed back from the first receiver and second side information fed back from the second receiver;
generating additional redundant bits for the first receiver and additional redundant bits for the second receiver based on the first side information and the second side information; and
broadcasting the additional redundant bits for the first receiver and the additional redundant bits for the second receiver,
wherein the first side information indicates a similarity between the first packet data broadcasted from the first transmitter and first packet data received by the first receiver, or indicates a similarity between the second packet data broadcasted from the second transmitter and second packet data received by the first receiver, and
wherein the second side information indicates a similarity between the first packet data broadcasted from the first transmitter and first packet data received by the second receiver, or indicates a similarity between the second packet data broadcasted from the second transmitter and second packet data received by the second receiver.

22. The method of claim 21, further comprising:
performing network coding of at least one portion of the additional redundant bits for the first receiver; and
performing network coding of at least one portion of the additional redundant bits for the second receiver,
wherein the broadcasting of the additional redundant bits for the first receiver and the additional redundant bits for the second receiver comprises broadcasting the network coded at least one portion of the additional redundant bits for the first receiver, and the network coded at least one portion of the additional redundant bits for the second receiver.

23. The method of claim 21, wherein the generating of the additional redundant bits for the first receiver and the additional redundant bits for the second receiver comprises determining the additional redundant bits that the first receiver uses to decode the first packet data and the second packet data, and determining the additional redundant bits that the second receiver uses to decode the first packet data and the second packet data, based on the first side information and the second side information.

24. The method of claim 21, wherein the generating of the additional redundant bits for the first receiver and the additional redundant bits for the second receiver comprises:
selecting at least one code corresponding to the first side information and the second side information based on a refinement codebook comprising systematic codes; and
utilizing the at least one code to generate the additional redundant bits for the first receiver and the additional redundant bits for the second receiver.

25. A non-transitory computer-readable storage medium storing program instructions to cause a processor to execute a method of a receiver, the method comprising:
receiving packet data transmitted from a transmitter, the transmitted packet data including at least one redundant bit;
generating side information indicating a similarity between the transmitted packet data and the received packet data, and further indicating to the transmitter to increase the amount of redundant bits included in the at least one redundant bit by an amount of bits determined based on the similarity between the transmitted packet data and the received packet data; and
feeding back the side information.

26. A communication apparatus for a receiver, the apparatus comprising:
a receiving unit configured to receive packet data transmitted from a transmitter, the transmitted packet data including at least one redundant bit;
a generating unit configured to generate side information indicating a similarity between the transmitted packet data and the received packet data, and further indicating to the transmitter to increase the amount of redundant bits included in the at least one redundant bit by an amount of bits determined based on the similarity between the transmitted packet data and the received packet data; and
a feedback unit configured to feed back the side information to the transmitter.

27. A communication apparatus for a transmitter, the apparatus comprising:
a transmitting unit configured to transmit packet data including at least one redundant bit to a receiver;
a receiver configured to receive side information fed back from a receiver, the side information indicating a similarity between transmitted packet data transmitted from the transmitter and received packet data received by the receiver, and further indicating to the transmitter to increase the amount of redundant bits included in the at least one redundant bit by an amount of bits determined based on the similarity between the transmitted packet data and the received packet data; and a generating unit configured to determine an additional amount of redundant bits based on the side information, wherein the transmitting unit is further configured to transmit the additional redundant bits to the receiver.

\* \* \* \* \*